(12) United States Patent
Fujimoto et al.

(10) Patent No.: US 7,655,273 B2
(45) Date of Patent: Feb. 2, 2010

(54) METHOD OF MANUFACTURING AN ELECTRODE ACTIVE MATERIAL PARTICLE FOR A RECHARGEABLE BATTERY

(75) Inventors: Masahisa Fujimoto, Osaka (JP);
Yasuyuki Kusumoto, Kobe (JP);
Masahide Miyake, Kobe (JP); Hiroaki Ikeda, Shimonoseki (JP); Shin Fujitani, Kobe (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 11/979,915

(22) Filed: Nov. 9, 2007
(Under 37 CFR 1.47)

(65) Prior Publication Data

US 2008/0226816 A1    Sep. 18, 2008

Related U.S. Application Data

(62) Division of application No. 10/239,745, filed as application No. PCT/JP01/02048 on Mar. 15, 2001, now Pat. No. 7,316,717.

(30) Foreign Application Priority Data

Mar. 28, 2000    (JP)    ............................ 2000-089272

(51) Int. Cl.
*B05D 7/00*    (2006.01)
(52) U.S. Cl. ..................................... 427/216
(58) Field of Classification Search ................. 427/216, 427/212; 429/231.9
See application file for complete search history.

(56) References Cited

U.S. PATENT DOCUMENTS 6,048,644 A * 4/2000 Tsuji et al. ............... 429/218.2

FOREIGN PATENT DOCUMENTS

| EP | 0 855 752 A2 | 7/1998 |
|---|---|---|
| EP | 1 028 476 A1 | 8/2000 |
| EP | 1 052 712 A1 | 11/2000 |
| EP | 1 052 713 A1 | 11/2000 |
| JP | 63-013264 A | 1/1988 |
| JP | 03-159075 A | 7/1991 |
| JP | 04-259764 A | 9/1992 |
| JP | 10-308207 | 11/1998 |
| JP | 10-308207 A | 11/1998 |
| JP | 11-86854 A | 3/1999 |
| JP | 11-102699 A | 4/1999 |
| JP | 11-176470 A | 7/1999 |
| JP | 11-233108 | 8/1999 |

(Continued)

OTHER PUBLICATIONS

Kaneda et al., JP 11-086854, machine translation (Mar. 1999).*

*Primary Examiner*—Michael Cleveland
*Assistant Examiner*—Robert Vetere
(74) *Attorney, Agent, or Firm*—Kubovcik & Kubovcik

(57) ABSTRACT

A method of manufacturing an electrode active material particle for a rechargeable battery wherein a layer of an active material capable of being alloyed with Li is formed on a surface of a metal particle incapable of being alloyed with Li and then a heat treatment is conducted to diffuse the active material into the metal particle so that the resulting active material particle has a concentration profile in which a concentration of a metal element of the metal particle decreases from an interior toward the surface.

7 Claims, 1 Drawing Sheet

FOREIGN PATENT DOCUMENTS

| | | |
|---|---|---|
| JP | 11-233108 A | 8/1999 |
| JP | 11-354118 A | 12/1999 |
| JP | 2000-12018 A | 1/2000 |
| JP | 2000-036323 | 2/2000 |
| JP | 2000-036323 A | 2/2000 |
| JP | 2000-173583 A | 6/2000 |
| JP | 2000-173590 A | 6/2000 |
| JP | 2000-285919 A | 10/2000 |
| JP | 2001-143698 A | 5/2001 |
| WO | 00/14817 A1 | 3/2000 |

\* cited by examiner

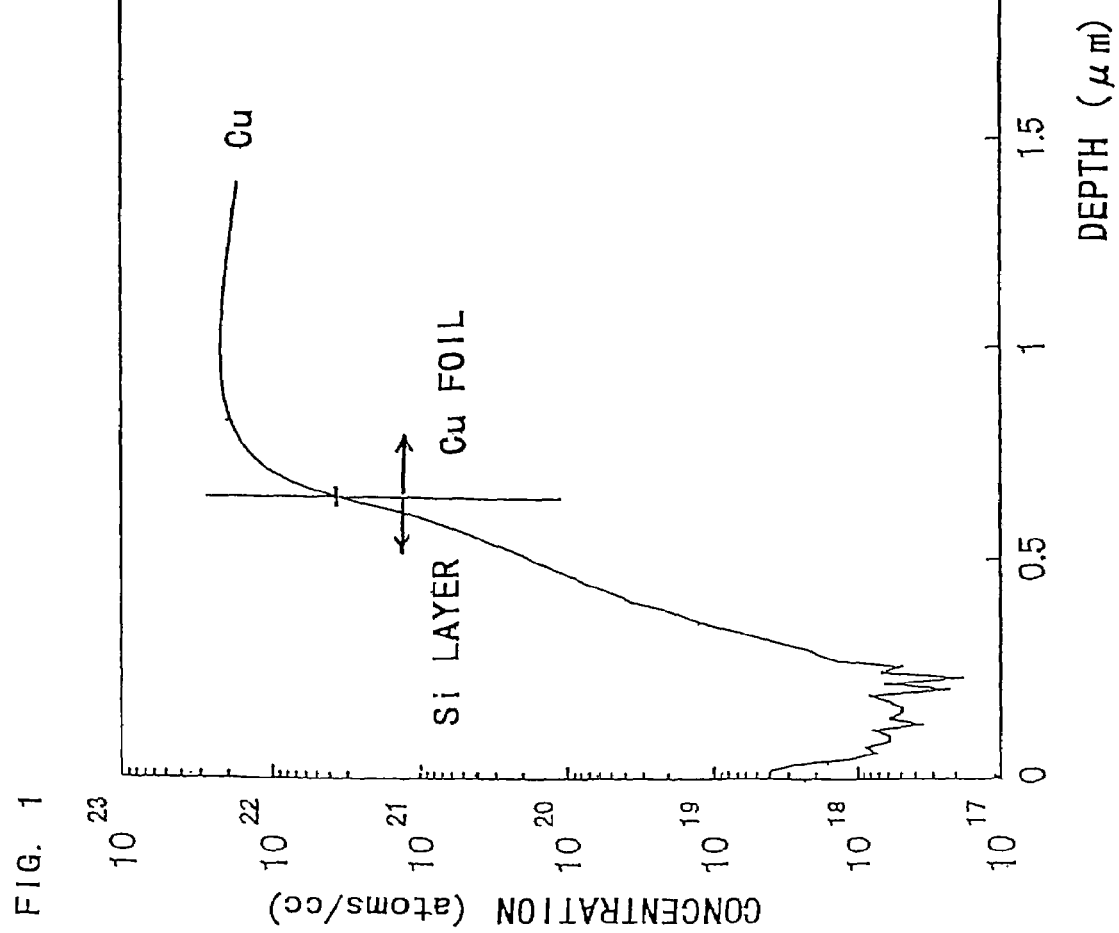

METHOD OF MANUFACTURING AN ELECTRODE ACTIVE MATERIAL PARTICLE FOR A RECHARGEABLE BATTERY

This application is a division of application Ser. No. 10/239,745, filed Jun. 20, 2003 now U.S. Pat. No. 7,316,717 which is a 371 of PCT/JP01/02048 filed Mar. 15, 2001, which claims priority of Japanese patent application No. 2000-89272 filed Mar. 28, 2000, each of which is incorporated herein by reference.

TECHNICAL FIELD

The present invention relates to a method of manufacturing an electrode active material particle for a rechargeable battery, and more specifically to a method of manufacturing an electrode active material particle for a rechargeable battery which employs, an active material capable of being alloyed with Li.

BACKGROUND ART

Attention has been paid to a lithium rechargeable battery which employs a lithium metal as a negative electrode, as a next generation rechargeable battery because of its high energy density. However, since the lithium metal is employed for the negative electrode, the lithium metal is dissolved and deposited during charge and discharge, thereby producing dendrites and deforming the electrode. For that reason, this type of lithium rechargeable battery is inferior in cycle characteristic and cannot be put to practical use. To solve such a problem, proposed are Li-alloy negative electrodes employing a metal capable of being alloyed with Li as well as carbon negative electrodes employing a carbon material such as graphite. Some of the carbon negative electrodes have been put to practical use.

Nevertheless, since the theoretical capacity of the carbon negative electrode is as low as 372 mAh/g, the energy density of the carbon negative electrode is disadvantageously low compared with the negative electrode which employs the metal lithium. Furthermore, when the Li-alloy negative electrode is employed, expansion and shrinkage in volume are repeated during charge and discharge. Due to this, the active material particles are pulverized during charge-discharge cycles, thereby disadvantageously deteriorating the cycle characteristics of the battery.

DISCLOSURE OF THE INVENTION

It is an object of the present invention to provide a method of manufacturing an electrode active material particle for a rechargeable battery which employs an electrode containing particles of an active material capable of being alloyed with Li, which can suppress the active material particles from being pulverized and which can surprisingly improve the cycle characteristics of the battery.

A method of manufacturing an electrode active material particle for a rechargeable battery according to the present invention is characterized in that a metal element incapable of being alloyed with Li is distributed by its diffusion into an active material particle.

In the first aspect according to the present invention, a concentration of the metal element incapable of being alloyed with Li increases from an interior of the active material particle toward a surface of the active material particle.

In the second aspect according to the present invention, a concentration of the metal element incapable of being alloyed with Li decreases from an interior of the active material particle toward a surface of the active material particle.

In the present invention, the active material particle capable of being alloyed with Li is not limited to a specific one as long as it is made of a material capable of being alloyed with Li. From a viewpoint of obtaining high electrode capacity, it is preferable that the active material particle is at least one selected from Si, Ge, Sn, Al and In. Si is more preferable since it has a high theoretical capacity.

In the present invention, the metal element incapable of being alloyed with Li which is diffused into the active material particle is not limited to a specific one as long as it is a metal element incapable of being alloyed with Li. It is, however, preferable that the metal element is a material having an excellent conductive property. From this viewpoint, Cu is particularly preferable.

Accordingly, in a preferred embodiment according to the present invention, the rechargeable battery is characterized in that the active material particle substantially consists of Si and the metal element is Cu.

The active material particle according to the present invention can be used as either a negative electrode active material or a positive electrode active material. However, the standard potential of the active material capable of being alloyed with Li relative to lithium metal is generally low, so that the active material particle of the present invention is considered to be used as a negative electrode active material in general.

EFFECT AND ADVANTAGE

An electrode active material is generally produced by binding a powdery active material using a binder. Therefore, a location in which electrode reaction occurs is the powder itself as an active material. If Li is absorbed by the powdery active material, Li is absorbed from the surface of the powder first. In general, if Li is absorbed an active material and alloys with the active material, the volume expands so that the surface of the powder expands. However, since Li does not enter the interior of the active material, the interior of the active material does not expand. Therefore, the ratio of expansion of the surface greatly differs from that of the interior, with the result that the powder is pulverized. By adjusting the difference in expansion ratio between the surface and the interior, it is possible to suppress the active material from being pulverized. According to the present invention, by distributing the metal element incapable of being alloyed with Li by its diffusion into the active material particle, the difference in expansion ratio between the surface and the interior is decreased to suppress the particle from being pulverized.

In the first aspect of the present invention, provided is a concentration profile in which the metal element incapable of being alloyed with Li increases from the interior toward the surface of the active material particle. In this case, on the surface, the concentration of the metal element incapable of being alloyed with Li is high and the concentration of the active material is low. Due to this, even if Li is absorbed by the active material, the expansion ratio of the surface of the active material is low and the difference in expansion ratio between the surface and the interior in which Li is not absorbed is not so great. Therefore, an internal stress decreases, making it possible to suppress the active material particle from being cracked.

In the second aspect of the present invention, provided is a concentration profile in which the metal element decreases from the interior toward the surface of the active material particle. In this case, the concentration of the active material on the surface of the particle is high. Therefore, the surface greatly expands and the interior expands less, thereby increasing an internal stress. However, the concentration of the active material is low in the interior of the particle, so that the crack formed at the surface of the particle does not reach the interior thereof and only the surface of the particle cracks. As a result, the particle is not pulverized as a whole and kept in a state in which the particle is suppressed from being pulverized.

According to the first aspect of the present invention, various methods may be considered as methods of manufacturing an active material particle in which the concentration of the metal element incapable of being alloyed with Li increases from the interior toward the surface of the active material particle. They include, for example, the following methods:

(1) A method of providing a layer of a metal element incapable of being alloyed with Li on the surface of an active material particle capable of being alloyed with Li by electroless plating and then heat treating the active material particle at an appropriate temperature to thereby diffuse the metal element from the surface into the interior of the active material particle.

If Si powder is used as the active material particle capable of being alloyed with Li and Cu is used as the metal element, then a Cu layer is formed on the surface of the Si powder by electroless plating, a heat treatment is then conducted to thereby diffuse Cu into the Si powder and it is possible to provide a concentration profile in which the concentration of Cu continuously increases from the interior toward the surface of the Si powder.

(2) A method of providing a layer of a metal element incapable of being alloyed with Li on the surface of an active material particle capable of being alloyed with Li by a mechano-fusion method and then heat treating the active material particle at an appropriate temperature to thereby diffuse the metal element from the surface into the interior of the active material particle.

If Si powder is used as the active material particle capable of being alloyed with Li and Cu is used as the metal element, then the Si powder is mechanically mixed with Cu fine particle, a Cu layer is formed on the surface of the Si powder by the mechano-fusion method, a heat treatment is then conducted at an appropriate temperature to thereby diffuse Cu into the Si powder and it is possible to provide a concentration profile in which the concentration of Cu continuously increases from the interior toward the surface of the Si powder.

According to the second aspect of the present invention, various methods may be considered as methods of manufacturing an active material particle in which the concentration of the metal element incapable of being alloyed with Li decreases from the interior toward the surface of the active material particle capable of being alloyed with Li. They include, for example, the following methods:

(3) A method of providing a layer of an active-material capable of being alloyed with Li on the surface of a metal particle incapable of being alloyed with Li by electroless plating and then heat treating the metal particle at an appropriate temperature.

For example, if Ge is used as the active material capable of being alloyed with Li and Cu is used as the metal element incapable of being alloyed with Li, the active material particle can be produced by such a method.

(4) A method of providing a layer of an active material capable of being alloyed with Li on the surface of a metal particle incapable of being alloyed with Li by a mechano-fusion method and heat treating the metal particle at an appropriate temperature.

If Si is used as the active material capable of being alloyed with Li and Cu is used as the metal element incapable of being alloyed with Li, then Cu powder and Si fine particle are mechanically mixed with each other, an Si layer is formed on the Cu powder by the mechano-fusion method, a heat treatment is conducted at an appropriate temperature to thereby diffuse Si into the Cu powder and it is possible to provide a concentration profile in which Cu decreases from the interior toward the surface of the particle.

(5) A method of providing a layer of an oxide of an active material on the surface of a metal particle incapable of being alloyed with Li by a mechano-fusion method or the like, then reducing the oxide at an appropriate temperature in a reducing atmosphere such as hydrogen airflow and also diffusing this reduced active material into the metal particle.

If Si is used as the active material capable of being alloyed with Li and Cu is used as the metal element incapable of being alloyed with Li, then an SiO layer or an $SiO_2$ layer is formed on the Cu powder by the mechano-fusion method or the like, this oxide is reduced at an appropriate temperature in a reducing atmosphere such as hydrogen airflow and, at the same time, Si formed by reduction is diffused into the Cu particle and it is possible to provide a concentration profile in which the concentration of Cu decreases from the interior of the particle toward the surface thereof.

In case of methods (1) to (5) stated above, the temperature of the heat treatment conducted to diffuse the metal element is preferably within a range of temperature raised from room temperature by about $\frac{1}{10}$ to $\frac{4}{5}$ of the melting point of the metal to be diffused with reference to the absolute temperature.

BRIEF DESCRIPTION OF THE DRAWING

FIG. 1 shows a Cu concentration profile obtained by SIMS analysis after subjecting a heat treatment to an Si film formed on a Cu foil.

BEST MODE FOR CARRYING OUT THE INVENTION

The present invention is below described in more detail by way of Examples. It will be recognized that the following examples merely illustrate the particle of the present invention but are not intended to be limiting thereof. Suitable changes and modifications can be effected without departing from the scope of the present invention.

[Production of Battery of the Present Invention]

[Production of Negative Electrode Active Material]

100 g of Si powder having an average particle diameter of 1 μm was immersed into 500 cc of an aqueous solution having a composition as shown in Table 1 at a temperature of 35° C. for 3 minutes, and then washed and immersed into 10% by volume of an HCl aqueous solution for 5 minutes, thereby forming Pd nuclei serving as a catalyst for electroless plating on the surface of the Si powder.

TABLE 1

| Substance | Chemical Formula | Concentration |
| --- | --- | --- |
| Palladium Chloride | $PdCl_2 \cdot 2H_2O$ | $0.2 \text{ g} \cdot dm^{-3}$ |
| Stannous Chloride | $SnCl_2 \cdot 2H_2O$ | $15 \text{ g} \cdot dm^{-3}$ |
| Concentrated Hydrochloric Acid | HCl | $200 \text{ cm}^3 \cdot dm^{-3}$ |

Next, this Si powder was immersed into an electroless plating bath being adjusted to have a pH of 12.5 and having the composition shown in Table 2, until the surface of the Si powder is Cu-colored. The Si powder on the surface of which a Cu layer was thus formed, was subjected to a heat treatment at 500° C. in vacuum, thereby diffusing Cu into the Si powder.

TABLE 2

| Substance | Concentration |
|---|---|
| Copper Sulfate | 7.5 g · dm$^{-3}$ |
| Rochelle Salt | 85 g · dm$^{-3}$ |
| Formaldehyde | 22 cm$^3$ · dm$^{-3}$ |
| Stabilizer (Methanol) | 7.5% |

To examine that Cu was diffused into the Si powder as a result of the heat treatment, an Si film having a thickness of 2 μm, instead of the Si powder, was formed on a Cu foil by the CVD method, and subjected to a heat treatment. It was confirmed that Cu was diffused into the Si thin film by SIMS analysis. FIG. 1. shows this result. As shown in FIG. 1, Cu is present in the Si thin film and diffused into the Si thin film. In addition, as shown in FIG. 1, Cu increases from the interior of the Si thin film toward the surface thereof. Accordingly, it is understood that the Si powder also has Cu diffused thereinto and has a Cu concentration profile that the concentration of Cu increases from the interior of the Si powder toward the surface thereof.

(Production of Working Electrode)

100 g of the negative electrode active material produced above was mixed with an N-methyl-pyrrolidone solution which fluororesin (PVdF), serving as a binder, is dissolved to have a concentration of 5%, the resultant mixture was smashed and mixed with a smash and mixing machine for 30 minutes to thereby prepare a slurry. This slurry was applied on an electrolytic copper foil having a thickness of 18 μm by the doctor blade technique, dried and cut into dimensions of 2×2 cm, thereby obtaining a working electrode.

(Production of Counter Electrode)

An Li metal having a thickness of 0.9 mm was cut into dimensions of 3×3 cm, thereby obtaining a counter electrode.

(Production of Test Cell)

The working electrode and the counter electrode produced as stated above were superposed on each other through a polypropylene separator, the superposed electrodes were put between glass plates and immersed into an electrolyte, thereby producing a test cell. The Li metal was immersed into the electrolyte so as not to contact with these electrodes, and was employed as a reference electrode. As the electrolyte, a solution obtained by dissolving 1 mol/litter of LiPF$_6$ into a mixed solvent of ethylene carbonate and diethyl carbonate in equivalent volume was employed.

[Production of Comparative Battery]

A comparative test cell was produced in the same manner as that of the above-stated test cell except that 100 g of Si powder having an average particle diameter of 1 μm was used as a negative electrode active material as it is. The obtained cell was referred to as Comparative Battery A. A comparison test cell was also produced as in the same manner as that of the above-stated test cell except that 100 g of copper silicide powder having an average particle diameter of 1 μm was used as a negative electrode active material as it is. The obtained cell was referred to as Comparative Battery B.

[Charge-Discharge Cycle Test]

A charge-discharge cycle test was conducted to each test cell. Each cell was charged to 0V with Li reference, discharged to 2V with Li reference and a charge-discharge current was 0.5 mA. Table 3 shows the discharge capacity and charge-discharge efficiency of each test cell.

TABLE 3

| | Inventive Battery | | Comparative Battery A | | Comparative Battery B | |
|---|---|---|---|---|---|---|
| Number of Cycles | Discharge Capacity mAh/g | Charge-Discharge Efficiency % | Discharge Capacity mAh/g | Charge-Discharge Efficiency % | Discharge Capacity mAh/g | Charge-Discharge Efficiency % |
| 1 | 2000 | 91 | 640 | 21 | 610 | 48 |
| 2 | 1990 | 99 | 320 | 50 | 450 | 74 |
| 5 | 1950 | 98 | 150 | 82 | 350 | 87 |
| 10 | 1930 | 97 | 130 | 82 | 295 | 87 |

As shown in Table 3, Inventive Battery exhibited high discharge capacity and good charge-discharge efficiency even if the number of cycles increases, compared with Comparison Batteries A and B. The test cells after 10 cycles were decomposed for investigation. In case of battery of the present invention, the negative electrode active material in the test cell was slightly separated from the Cu foil serving as a current collector, while the shape of the negative electrode active material was kept. In case of the comparison batteries A and B, by contrast, most of the negative electrode active material was separated from the current collector, and the shape of the negative electrode active material itself was not kept. The active material was pulverized and most of then fell off and were dispersed the electrolyte.

As can be understood from the above, in the battery of the present invention, pulverization of the active material is not caused by charge-discharge cycle test and therefore the battery of the present invention exhibits excellent cycle characteristics.

UTILITY IN INDUSTRY

According to the present invention, it is possible to suppress active material particles from being pulverized and to greatly improve cycle characteristics.

The invention claimed is:

1. A method of manufacturing an electrode active material particle for a rechargeable battery characterized by forming a layer of an active material capable of being alloyed with Li on a surface of a metal particle incapable of being alloyed with Li and then conducting a heat treatment to diffuse said active material into said metal particle so that the resulting active material particle has a concentration profile in which a concentration of a metal element of said metal particle decreases from an interior toward the surface.

2. The method of manufacturing an electrode active material particle for a rechargeable battery according to claim 1, characterized in that said active material is at least one selected from Si, Ge, Sn, Al and In.

3. The method of manufacturing an electrode active material particle for a rechargeable battery according to claim 1, characterized in that a metal element of said metal particle is Cu.

4. The method of manufacturing an electrode active material particle for a rechargeable battery according to claim 1, characterized in that said active material substantially consists of Si, and a metal element of said metal particle is Cu.

5. The method of manufacturing an electrode active material particle for a rechargeable battery according to claim 1, characterized in that said active material particle is used as a negative electrode active material.

6. A method of manufacturing an electrode active material particle for a rechargeable battery characterized by forming a layer containing at least one selected from Si, Ge, Sn, Al and In as the active material, on a surface of a metal particle containing Cu and then conducting a heat treatment to diffuse said active material into said metal particle so that said active material particle has a concentration profile in which a concentration of said Cu decreases from an interior toward the surface.

7. The method of manufacturing an electrode active material particle for a rechargeable battery according to claim 6, characterized in that said active material particle is used as a negative electrode active material.

* * * * *